(12) United States Patent
Gerber et al.

(10) Patent No.: US 8,669,707 B2
(45) Date of Patent: Mar. 11, 2014

(54) ELECTRONIC CONTROL GEAR FOR OPERATING AT LEAST ONE LED AND/OR AT LEAST ONE DISCHARGE LAMP

(75) Inventors: Maximilian Gerber, Munich (DE); Reinhard Lecheler, Neuburg/Donau (DE); Siegfried Mayer, Moosinning (DE); Arwed Storm, Dachau (DE)

(73) Assignee: OSRAM AG, Munich (DE)

( * ) Notice: Subject to any disclaimer, the term of this patent is extended or adjusted under 35 U.S.C. 154(b) by 163 days.

(21) Appl. No.: 13/419,450

(22) Filed: Mar. 14, 2012

(65) Prior Publication Data

US 2012/0235577 A1    Sep. 20, 2012

(30) Foreign Application Priority Data

Mar. 16, 2011  (DE) .......................... 10 2011 005 596

(51) Int. Cl.
*H05B 37/02* (2006.01)
(52) U.S. Cl.
USPC .......................................... 315/152; 315/178
(58) Field of Classification Search
USPC ..................... 315/152, 178, 200 R, 201, 312
See application file for complete search history.

(56) References Cited

U.S. PATENT DOCUMENTS

| | | | | |
|---|---|---|---|---|
| 5,430,356 A * | 7/1995 | Ference et al. | ................. | 315/291 |
| 2007/0210719 A1* | 9/2007 | Busse et al. | ................... | 315/158 |
| 2008/0158871 A1* | 7/2008 | McAvoy et al. | ............... | 362/227 |
| 2010/0060187 A1* | 3/2010 | Newman et al. | ............... | 315/291 |
| 2010/0164389 A1* | 7/2010 | Dellian et al. | ................. | 315/182 |

FOREIGN PATENT DOCUMENTS

| | | |
|---|---|---|
| DE | 102008017557 A1 | 10/2009 |
| DE | 102009050203 A1 | 4/2011 |
| DE | 102010029095 A1 | 11/2011 |
| EP | 0871103 A1 | 10/1998 |
| EP | 1555861 A1 | 7/2005 |
| EP | 2187710 A2 | 5/2010 |
| WO | 2009003509 A1 | 1/2009 |
| WO | 2010071913 A1 | 7/2010 |

OTHER PUBLICATIONS

English abstract of DE 102008017557 A1.
English abstract of DE 102009050203 A1.
English abstract of DE 102010029095 A1.
English language abstract of EP0871103 A1 dated Oct. 14, 1998.
English language abstract of EP1555861 A1 dated Jul. 20, 2005.
English language abstract of EP2187710 A2 dated May 19, 2010.

* cited by examiner

*Primary Examiner* — Daniel D Chang

(57) ABSTRACT

An electronic control gear for operating at least one of at least one LED and at least one discharge lamp is provided. It may include a first terminal for coupling to a phase of an AC voltage supply; a second terminal for coupling to the neutral conductor of the AC voltage supply; a control input for coupling in a control signal of a control apparatus; a first output for coupling to the LED; a second output for coupling to the discharge lamp; a first driver circuit for the LED; a second driver circuit for the discharge lamp; an evaluation apparatus for evaluating the control signal at the control input, the evaluation apparatus comprising a microcontroller, which activates said driver circuits depending on the control signal, wherein a first capacitance is coupled between the second terminal and the control input.

14 Claims, 7 Drawing Sheets

ELECTRONIC CONTROL GEAR FOR OPERATING AT LEAST ONE LED AND/OR AT LEAST ONE DISCHARGE LAMP

CROSS-REFERENCE TO RELATED APPLICATION

This application claims priority to German Patent Application Serial No. 102011005596.7, which was filed Mar. 16, 2011, and is incorporated herein by reference in its entirety.

TECHNICAL FIELD

Various embodiments relate to electronic control gear for operating at least one LED and/or at least one discharge lamp.

BACKGROUND

In conventional installations of lighting devices in combination with a motion sensor, as are known from stairwells in the prior art, for example, on activation of the motion sensor that phase of an AC voltage supply which is coupled to the motion sensor is coupled to the electronic control gear of the lighting device, said electronic control gear being connected downstream of the motion sensor. As a result, the lighting device is switched on.

Recently, electronic control gear have been disclosed, for example the so-called dual-power ECG by the applicant, in which a specific operating mode can be selected by means of a control input. In the case of the electronic control gear mentioned by way of example, it is possible in this context to operate only at least one LED or only at least one discharge lamp or both at the same time. In the case of such electronic control gear, the switching output of the motion sensor is coupled to the control input of the electronic control gear, while the electronic control gear itself is coupled to a phase of the AC voltage supply. If there is no defined signal present at the control input, an undesired signal can result at the control input owing to capacitive coupling of other live lines, and this undesired signal is interpreted incorrectly by the evaluation apparatus. There is therefore the risk of capacitive couplings in particular since the control line which is coupled to the control input and at whose other end the motion sensor is located is often laid parallel to the AC supply line of the electronic control gear.

A conventional evaluation apparatus which may be used in this context is illustrated schematically in FIG. 1. If a switch S1 is closed, a voltage drop occurs across a shunt resistor R1, with this voltage being proportional to the voltage at the control input SW. A voltage divider is formed by the ohmic resistors R1 and R2, between which a diode D1 is coupled for the purpose of rectification. Two varistors Var1 and Var2 serve the purpose of protecting the switch S1 from overvoltages. The part including the switch S1 and the ohmic resistor R1 is connected in parallel with the capacitor C1. The microcontroller µC retrieves the voltage drop across the shunt resistor R1 as a ratio of 1:10. This is because, in the evaluation apparatus illustrated in FIG. 1, the input impedance is only 10 kohms and losses of the evaluation apparatus can be minimized by the driving with a ratio of 1:10. In addition to the costs incurred for the varistors Var1, Var2, the design of the switch S1 is in this case problematic. Said switch S1 needs to be designed for surge pulses of 800 V.

An increase in the input impedance in order to reduce the losses is not an option since, as a result, the problems owing to capacitive charges on the control line would be increased. That is to say that if the input impedance is increased, the discharge of the line capacitance would be slower and would therefore have a disadvantageous effect on the evaluation of the control signal SW at the input of the microcontroller µC. An increase in the duty factor for the purpose of counteracting an increase in the input impedance would in turn result in the lengths of time for which current flows from the control input SW to the reference potential being increased, as a result of which the losses of the evaluation apparatus would again be increased. Moreover, it is disadvantageous that the evaluation apparatus uses two pins of the microcontroller µC. There are applications in which only a single pin can be provided for the evaluation apparatus.

SUMMARY

An electronic control gear for operating at least one of at least one LED and at least one discharge lamp is provided. It may include a first terminal for coupling to a phase of an AC voltage supply; a second terminal for coupling to the neutral conductor of the AC voltage supply; a control input for coupling in a control signal of a control apparatus; a first output for coupling to the LED; a second output for coupling to the discharge lamp; a first driver circuit for the LED; a second driver circuit for the discharge lamp; an evaluation apparatus for evaluating the control signal at the control input, the evaluation apparatus comprising a microcontroller, which activates said driver circuits depending on the control signal, wherein a first capacitance is coupled between the second terminal and the control input.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Figure 1:
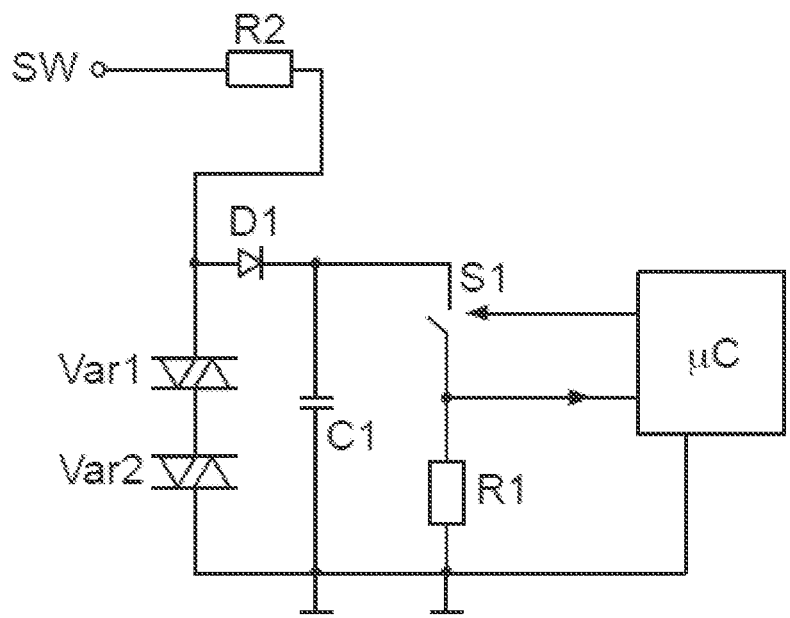
FIG. 1 shows a schematic illustration of a conventional evaluation apparatus of electronic control gear.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

The same reference symbols are used for identical and functionally identical components in the various figures. These reference symbols are therefore only introduced once for reasons of clarity.

Various embodiments provide an electronic control gear for operating at least one LED and/or at least one discharge lamp including a first terminal for coupling to a phase of an AC voltage supply, a second terminal for coupling to the neutral conductor of the AC voltage supply, a control input for coupling in a control signal of a control apparatus, which for its part is coupled to a phase of the AC voltage supply, a first output for coupling to the at least one LED, a second output for coupling to the at least one discharge lamp, a first driver circuit for the at least one LED, a second driver circuit for the at least one discharge lamp, and an evaluation apparatus for evaluating the control signal at the control input, the evaluation apparatus including a microcontroller, which is coupled to the first and the second driver circuit in order to activate said driver circuits depending on the control signal, the microcontroller having a drive input, which can be coupled to the control input.

Various embodiments develop electronic control gear of the above described type such that increased interference immunity of the control input can be provided with low costs at the same time.

Various embodiments are based on the knowledge that, in the phase in which a system half cycle is present at the control input (such states are referred to below as "ON"), the line capacitance is short-circuited and therefore a capacitive voltage divider, which includes the line capacitance, acting at the control input, of a control line to be connected to the control input and the first capacitance, does not function. Rather, the capacitive voltage divider only functions in the phase in which the signal at the control input is "OFF", i.e. is zero. Precisely in the phase in which the interference as a result of the line capacitance occurs is this interference reduced by means of the capacitive voltage divider and does this interference therefore reduce the risk of erroneous interpretation of the signal at the drive input of the microcontroller.

Owing to this measure, the interference immunity of the control input can be markedly increased. Therefore, relatively long control lines can be connected to the electronic control gear, as a result of which the possibility of broader application fields is opened up. There is a considerable cost saving in comparison with the prior art since no varistors are required. Likewise, there is no need for a switch to be dimensioned for 800 V. Owing to this saving, there is likewise a reduced space requirement.

Various embodiments take into consideration the circumstance in which in practice further lighting apparatuses and electronic control gear can be coupled to the phase and to the neutral conductor to which electronic control gear according to the invention is coupled in order to switch on and off all of said lighting apparatuses and electronic control gear via one and the same motion sensor, for example. If, however, an incandescent lamp is coupled, for example, between the phase which is coupled to the motion sensor and is intended to be coupled to the control input of electronic control gear according to various embodiments and the neutral conductor, said incandescent lamp acts as an ohmic resistance. The signal on the neutral conductor is thus transmitted via the incandescent lamp to the control input of electronic control gear according to various embodiments and disrupts the evaluation of the control signal there. In order to prevent this, in accordance with various embodiments provision may be made for the evaluation apparatus to furthermore include a suppression apparatus, which is coupled between the control input and the drive input of the microcontroller, the suppression apparatus being designed to couple the control signal to the drive input of the microcontroller only during the time periods during which the signal at the second terminal is zero. Thus, in the time periods in which a signal is present on the neutral conductor which could result in interference, the control signal is not coupled to the drive input of the microcontroller. Interference owing to other lighting apparatuses which are coupled to the same control apparatus, e.g. motion sensor, can therefore be reliably avoided.

In various embodiments, such a suppression apparatus may include an electronic switch with a control electrode, a reference electrode and a working electrode, the control electrode being coupled to the second terminal, the reference electrode being coupled to a reference potential, e.g. ground, the working electrode being coupled to a coupling point, which is coupled on one side to the drive input of the microcontroller and on the other side to the control input. By virtue of this configuration, in the case of a signal ON on the neutral conductor, the coupling point is drawn to ground, and therefore so is the drive input of the microcontroller. In the event of a signal OFF on the neutral conductor, on the other hand, the electronic switch turns off, with the result that the signal at the control input is applied via the coupling point to the drive input of the microcontroller.

Further, in various embodiments, a second capacitance may be coupled between the coupling point and the reference potential.

This second capacitance serves the purpose of suppressing interference caused by injected interference as a result of burst pulses.

Further, in various embodiments, a first ohmic resistor is coupled between the control input and the coupling point, and a second ohmic resistor is coupled between the drive input of the microcontroller and the reference potential. This may result in a voltage divider which, in the present configuration, may be designed to have a high resistance in comparison with the prior art. The losses as a result of the evaluation apparatus are therefore minimal. The input impedance of the control input may be between 700 kohms and 2 Mohms, e.g. 1 Mohm in the case of electronic control gear according to various embodiments. As a result, the losses may be markedly reduced in comparison with the conventional control gear. In this case, a diode, which is used for rectification, may be coupled between the coupling point and the drive input of the microcontroller.

In various embodiments, the microcontroller may be designed in such a way that it evaluates the peak value of the signal at its drive input. As a result, the interference immunity may be further increased. In contrast, a mean value measurement would result in a reduction in the signal-to-noise ratio.

In various embodiments, a predeterminable threshold value is stored in the microcontroller, the microcontroller being designed to categorize a signal at its drive input as "high" when the peak value of the drive signal is above the predeterminable threshold value and as "low" when the peak value of the drive signal is below the predeterminable threshold value. It may be established in the microcontroller that a "high" results in activation of the at least one fluorescent lamp and a "low" results in activation of the at least one LED.

In various embodiments, the predeterminable threshold value stored in the microcontroller, in relation to the peak value of the signal at the control input, may be between 15 and 25% of this peak value, e.g. between 18 and 23%. In the case of an AC system voltage with an amplitude of at most 255 units, as is conventional in Germany, the threshold value is accordingly in various embodiments approximately 55 units. For other AC system voltages, the threshold value may be matched correspondingly.

Further, in various embodiments, the electronic control gear may include a rectifier, whose input has a first input terminal and a second input terminal, the first input terminal being coupled to the second terminal, the second input terminal being coupled to the first phase or the second phase or the third phase of a three-phase AC voltage supply, the low potential at the output of the rectifier representing the reference potential of the electronic control gear. As a result of a suitably selected threshold value, as described above, the system phase applied to the control input via the control apparatus, i.e. e.g. the motion sensor, may be a different system phase than that at the system input of the electronic control gear, the latter system phase then being coupled to the rectifier. It may thus be possible for existing installations to be retrofitted for an energy-efficient system without considerable complexity.

In accordance with various embodiments, the control apparatus represents a motion sensor.

Figure 2:
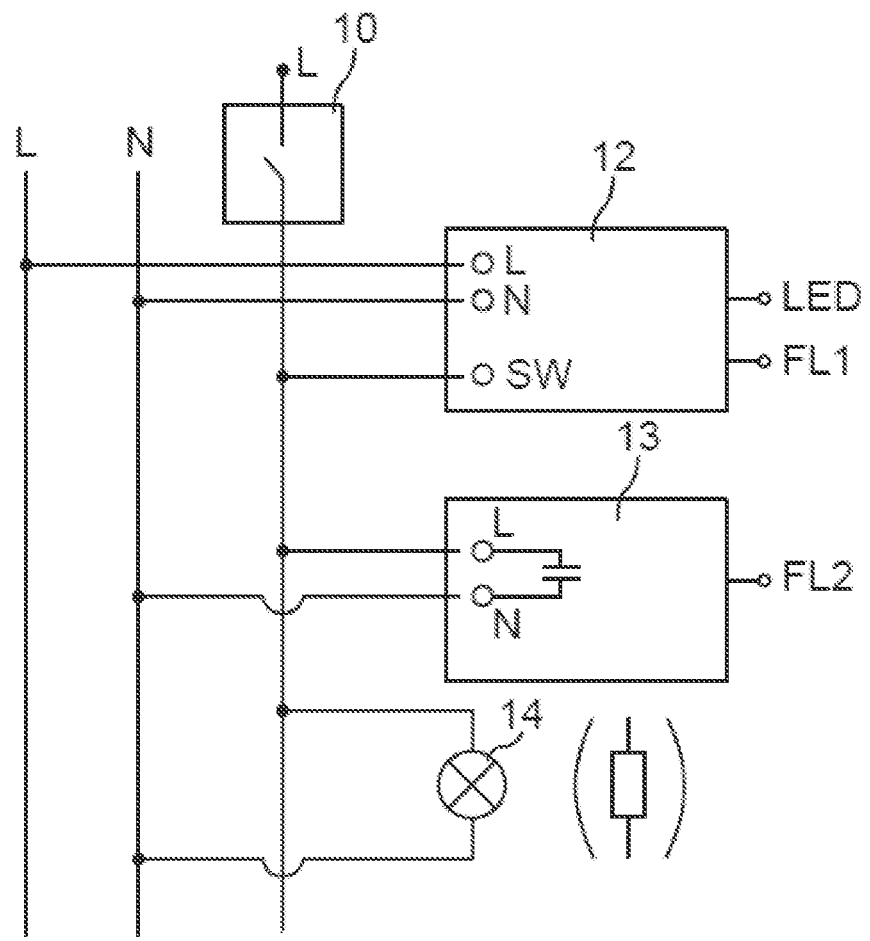
FIG. 2 shows a schematic illustration of a configuration in which various lighting devices are switched via one and the same motion sensor.

FIG. 2 shows a schematic illustration showing a problem as may occur in connection with various embodiments. In this case, a plurality of lighting devices are controlled via one and the same motion sensor 10. By way of example, the FIG. 2 shows electronic control gear 12 according to various embodiments with a light emitting diode (LED) and a discharge lamp FL1 coupled to the output thereof. A second discharge lamp FL2 is coupled to the output of second electronic control gear 13. Finally, an incandescent lamp 14 is provided. In the case of the control gear according to various embodiments, the control gear is coupled firstly to a phase L of a three-phase AC voltage supply, and moreover to the neutral conductor N of the AC voltage supply. The switching output of the motion sensor 10 is coupled to a control input SW of the electronic control gear 12 according to various embodiments. In the case of the control gear 13, the supply terminal L is coupled to the switching output of the motion sensor 10, while the neutral conductor terminal N is coupled to the neutral conductor N. The incandescent lamp 14 is finally coupled between the switching output of the motion sensor 10 and the neutral conductor N.

One problem with this configuration is that in phases in which the motion sensor 10 is switched so as to be nonconductive or the phase L is "OFF" when the motion sensor is switched so as to be conductive, an undesired signal can be produced at the control input SW of control gear 12 according to various embodiments, to be precise, for example, as a result of a capacitive coupling between the L terminal and the N terminal in the case of the electronic control gear 13 or simply by virtue of the fact that the incandescent lamp 14 acts as an ohmic resistance and to this extent transmits a signal from the neutral conductor to the switching output of the motion sensor 10.

Figure 3:
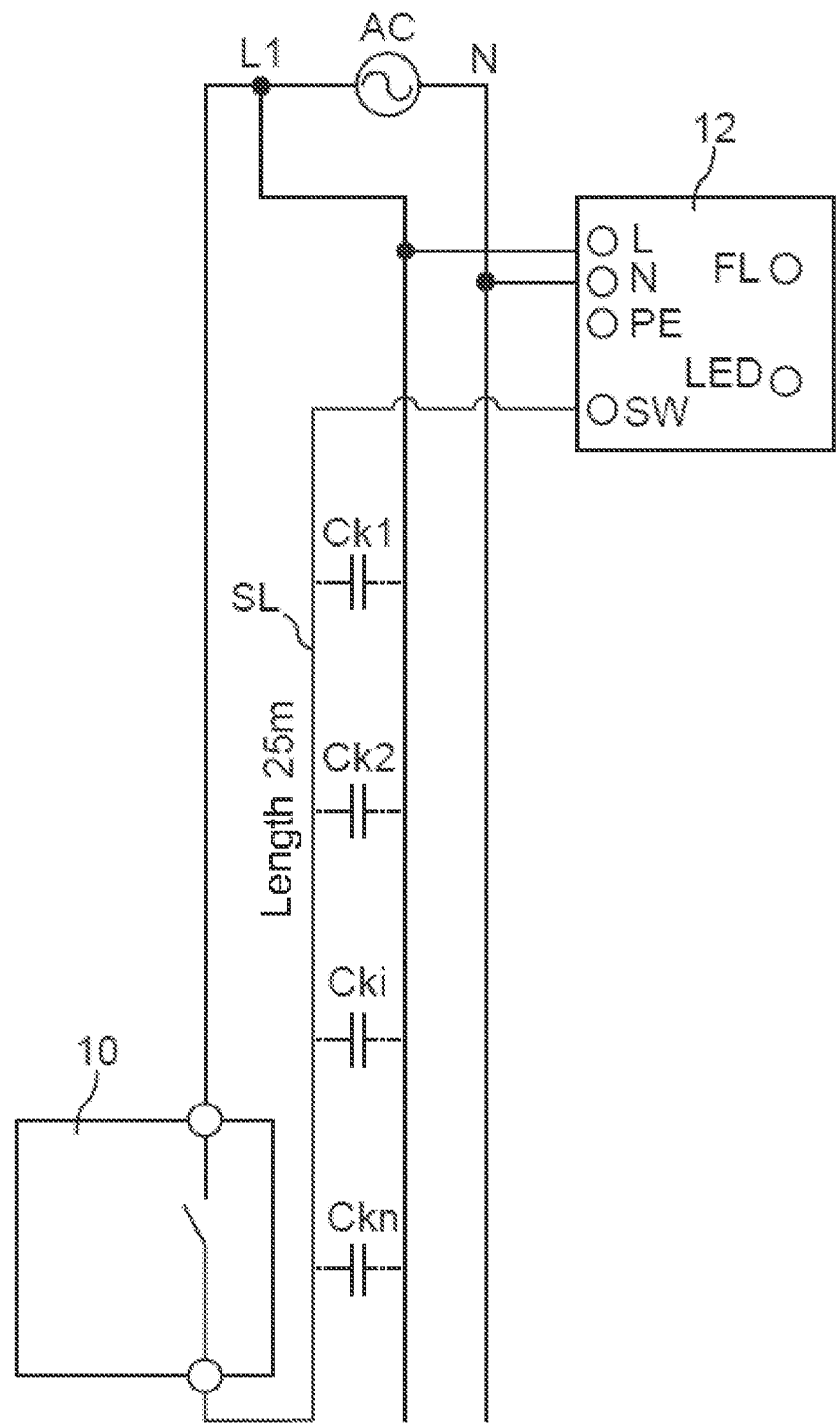
FIG. 3 shows a schematic illustration for explaining the problem resulting from line capacitances in electronic control gear according to various embodiments.

FIG. 3 shows that problems with the signal at the control input SW may arise even without the configuration illustrated in FIG. 2, to be precise as a result of sectional line capacitances Ck1, Ckn. The terminal PE is intended to be coupled to the protective ground. Line capacitances represent coupling capacitances between a system phase, in this case L1, and the control line SL, which is 25 m in this example. The capacitance per unit length in the case of a five-conductor NYM cable with a diameter of 1.5 mm$^2$ is typically 100 pF/m and at most 120 pF/m. The line capacitance Ck is the sum of the illustrated sectional line capacitances Ck1 to Ckn. When the motion sensor 10 is switched so as to be conducting, the line capacitance Ck is short-circuited, with the result that there are no problems at the control input SW of electronic control gear 12 according to various embodiments.

FIG. 3 shows an AC voltage supply AC, whose neutral conductor is coupled to the terminal N of electronic control gear according to various embodiments and whose phase L1 is coupled firstly to the terminal L of electronic control gear according to various embodiments and secondly to the motion sensor 10. The switching output of the motion sensor 10 is coupled to the control input SW of electronic control gear 12 according to various embodiments. The phases in which the motion sensor 10 is switched so as to be conducting and the phase L1 is OFF or the phases in which the motion sensor 10 is switched so as to be nonconducting are accordingly problematic.

Figure 4:
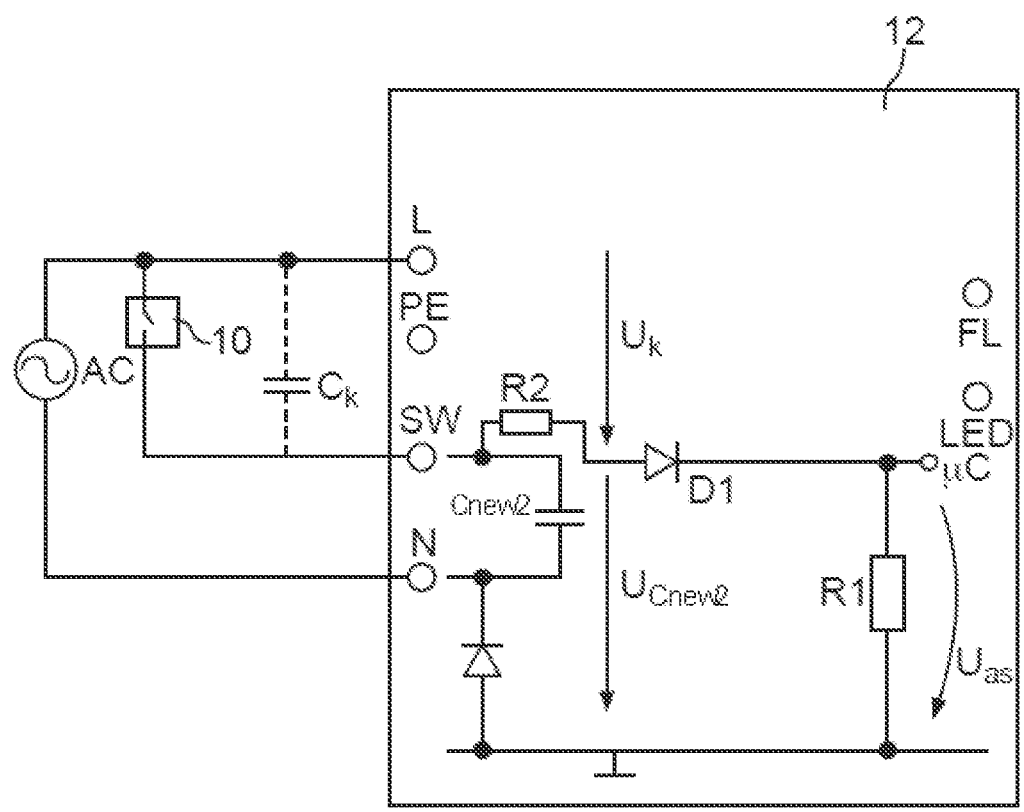
FIG. 4 shows a schematic illustration showing the mode of operation of a capacitive voltage divider in electronic control gear according to various embodiments.

FIG. 4 shows another illustration of the situation shown in FIG. 3, with moreover a measure for reducing the capacitive interference in accordance with various embodiments being illustrated in FIG. 4. As in FIG. 3, an AC voltage supply AC is provided, of which one phase is coupled to the terminal L of electronic control gear according to various embodiments. The neutral conductor of the AC supply AC is coupled to the terminal N of electronic control gear according to various embodiments. As in FIG. 3, the motion sensor 10 is connected between that phase of the AC supply AC which is coupled to the terminal L and the control input SW, said motion sensor 10 being in its nonconducting state in this case too for the purpose of illustrating the basic concepts of various embodiments. Therefore, the line capacitance $C_k$ is effective between the terminals L and SW of the electronic control gear according to various embodiments. Since said line capacitance is actually distributed over a plurality of sections, it is illustrated by dashed lines in the illustration in FIG. 4.

According to various embodiments, a capacitance $C_{new2}$ is coupled between the terminal SW and the terminal N, said capacitance forming, together with the line capacitance $C_k$, a capacitive voltage divider. The aim consists in keeping the voltage drop $U_{Cnew2}$ across the capacitor $C_{new2}$ low by virtue of suitable dimensioning of the capacitor $C_{new2}$ when there is no control signal present at the control input SW, i.e. the motion sensor 10 is switched so as to be nonconducting. The voltage drop across the line capacitance $C_k$ is denoted by $U_k$. Preferably, the capacitance $C_{new2}$ is selected such that the voltage drop between the terminals L and SW is approximately nine times as great as the voltage drop between the terminals SW and N.

As can be seen from the illustration, the voltage drop $U_{as}$ across the resistor R1 is passed to the drive input of the microprocessor µC using a resistive voltage divider, which includes the resistors R2 and R1. The diode D1 is used for rectification.

Before any further details will be given in respect of the exemplary embodiment illustrated in FIG. 6 of electronic control gear 12 according to various embodiments, reference will first be made to parts of FIG. 5 in which the time profiles of some voltages which are significant for various embodiments are illustrated schematically.

Firstly, curve a) shows the time profile of the voltage at the terminal L, i.e. in this case the phase L1, with respect to ground, with ground representing the reference potential of the electronic control gear 12. Accordingly, this signal includes a sequence of sinusoidal half-cycles, which are each interrupted by phases which last as long as a half-cycle, with an amplitude of zero. Curve b) shows the time profile of the voltage at the terminal N with respect to ground. As can be seen from the illustration, this profile is also a sequence of sinusoidal half-cycles, which are interrupted by phases of equal length with the amplitude zero. If the signal shown by curve a) and the signal shown by curve b) are compared with one another, it can be seen that said signals are in phase opposition, i.e. where curve a) has the amplitude zero, curve b) has a sinusoidal half-cycle, and vice versa.

Curve c) shows the time profile of the voltage $U_{as}$ at the drive input of the microprocessor µC. Reference will once again be made to this curve after discussion of the various embodiments illustrated in FIG. 5.

Figure 5:
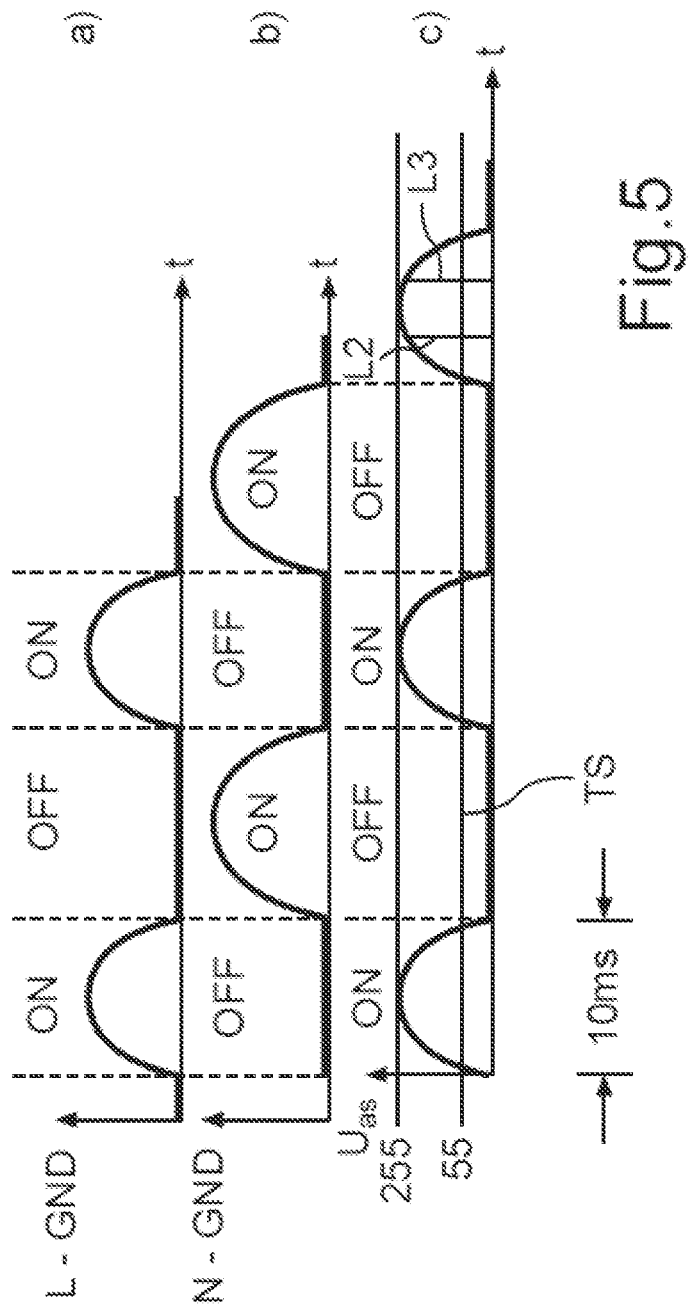
FIG. 5 shows a schematic illustration of the time profile of the signal on the phase L1 to reference potential GND, of the neutral conductor N to reference potential GND and of the signal $U_{as}$ at the drive input of the microcontroller µC.
Figure 6:
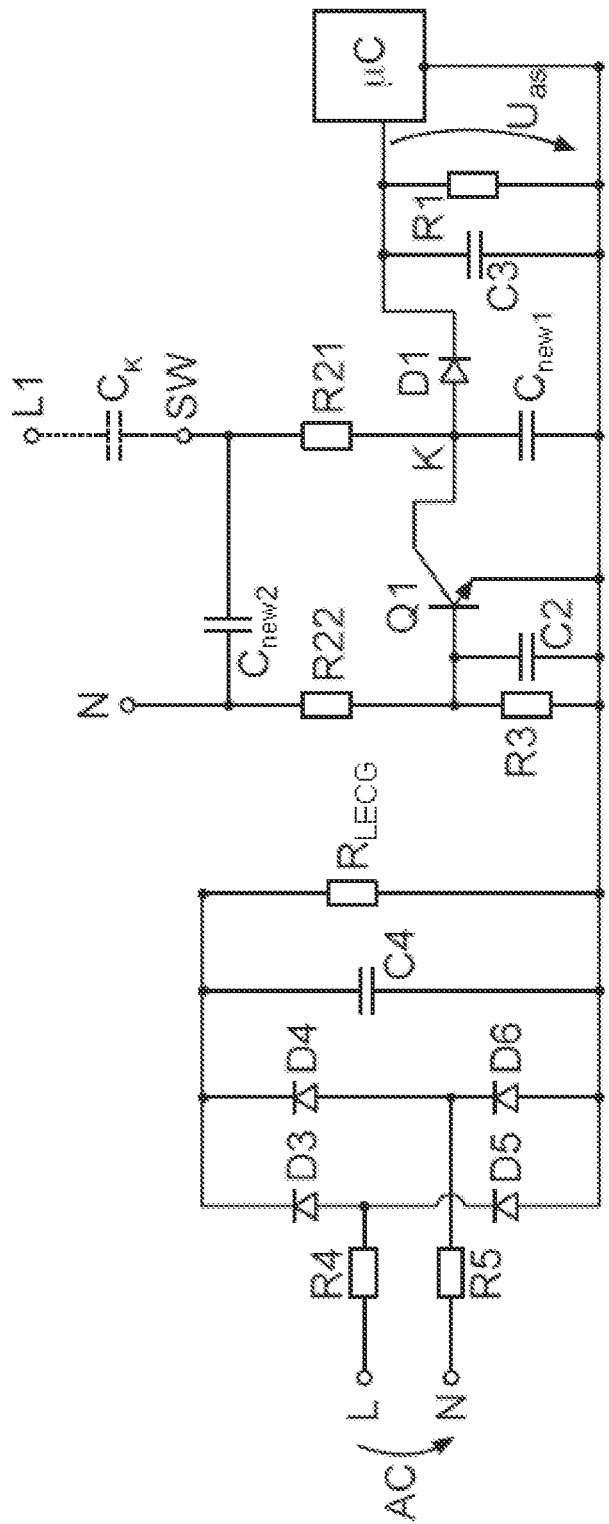
FIG. 6 shows a schematic illustration of an exemplary embodiment of electronic control gear according to various embodiments.

In the embodiments illustrated in FIG. 6 of electronic control gear 12 according to various embodiments, the line capacitance $C_k$ is illustrated by dashed lines between the phase L1, selected by way of example, and the control input SW. When the motion sensor 10 is switched so as to be conducting, the profile of the signal at the control input SW corresponds to curve a) in FIG. 5.

When SW=ON, N is according equal to OFF. Thus, a signal is applied, via the ohmic resistor R21, to a coupling point K, which for its part is connected to the reference potential via the diode D1 and the parallel circuit including the resistor R1 and a capacitance C3. A capacitance $C_{new1}$, which is coupled between the coupling point K and the reference potential, is used to suppress interference as a result of burst pulses. The signal at the coupling point K is therefore applied to the drive input of the microprocessor µC via the diode D1.

As long as N is equal to OFF, no signal is applied to the base of the transistor Q1 via the resistive voltage divider R22, R3. The capacitor C2, which is connected in parallel with the ohmic resistor R3, is used for filtering interference. Accordingly, the transistor Q1 turns off in this phase and does not influence the potential at the coupling point K.

In the phase in which SW is equal to OFF, N is equal to ON. As a result, the transistor Q1 is switched so as to be conducting, as a result of which the potential at the coupling point K is drawn to reference potential. The voltage $U_{as}$ at the drive input of the microprocessor µC is therefore zero.

In various embodiments, the phase in which the motion sensor 10 is switched so as to be nonconducting, whereafter only a voltage as a result of the line capacitance $C_k$ is present at the terminal SW, is problematic. When N is equal to OFF, this could result in an undesired voltage $U_{as}$ at the drive input of the microprocessor µC. Various embodiments therefore provide for the interference voltage caused by the line capacitance $C_k$ to be reduced to an uncritical voltage level at the input SW via a capacitor $C_{new2}$, which is coupled between the terminal SW and the terminal N. This may ensure that, given this configuration, the voltage $U_{as}$ at the control input of the microprocessor µC does not exceed a predeterminable threshold value TS for activation of the fluorescent lamp FL to an undesirable extent.

The left-hand half of FIG. 6 shows that, in the exemplary embodiment, electronic control gear according to various embodiments has a terminal L for coupling to a phase and a terminal N for coupling to the neutral conductor of a three-phase AC voltage supply. A rectifier, which includes the diodes D3, D4, D5 and D6, is connected downstream of the terminals L and N. The parallel circuit including a capacitor C4 and an ohmic resistor $R_{LECG}$ is coupled to the output of the rectifier, the ohmic resistor $R_{LECG}$ representing the load of the electronic control gear.

The curve c) shown in FIG. 5 shows the time profile of the voltage $U_{as}$ at the drive input of the microprocessor µC when the motion sensor 10 is switched so as to be conducting. It can be seen that a signal $U_{as}$ is coupled to the microprocessor input µC only when N is equal to OFF. Thus, the problem mentioned in connection with FIG. 2 is taken into consideration.

Figure 7:
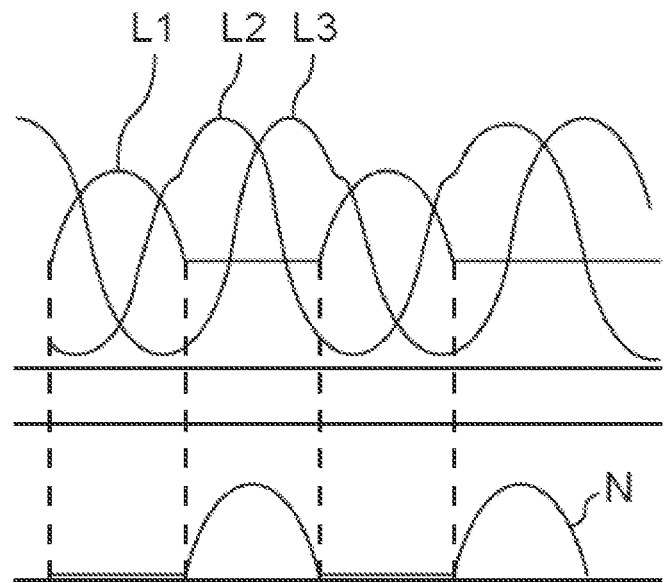
FIG. 7 shows a schematic illustration of the time profile of different system phases L1, L2, L3 in relation to the time profile of the signal on the neutral conductor N.

FIG. 7 shows the time profile of different phases L1, L2, L3 of a three-phase AC supply AC on the basis of the time profile of the signal at the neutral conductor. With reference to curve c) from FIG. 5, the peak value of the signal $U_{as}$ is evaluated by the microprocessor µC. If it is assumed that the maximum value of a half-cycle would correspond to 255 units, a threshold TS of 55 units, for example, can be provided in the microprocessor µC. In this case, the term "units" has been selected because the actual voltage value is not critical; this voltage value can be adjusted, if required, by corresponding dimensioning of the voltage dividers concerned, for example. Amplitudes above this threshold TS are considered as "ON", i.e. logic "high", while signals below this threshold TS are considered as "OFF", i.e. logic "low". The illustration in the right-hand half-cycle of the curve c) shows that even when the phase L1 is not coupled to the motion sensor 10, a reliable evaluation is possible. Even when using the phases L2 or L3, amplitudes above the predeterminable threshold TS result when evaluating the peak value, with the result that a logic "high" can be reliably distinguished from a logic "low".

In various embodiments, the microcontroller µC measures the amplitude of the signal $U_{as}$ at its drive input every 400 µs. Given the exemplarily selected, abovementioned threshold TS, electronic control gear 12 according to various embodiments may be used for system voltages with a maximum amplitude of between 140 and 400 V.

Figure 8:
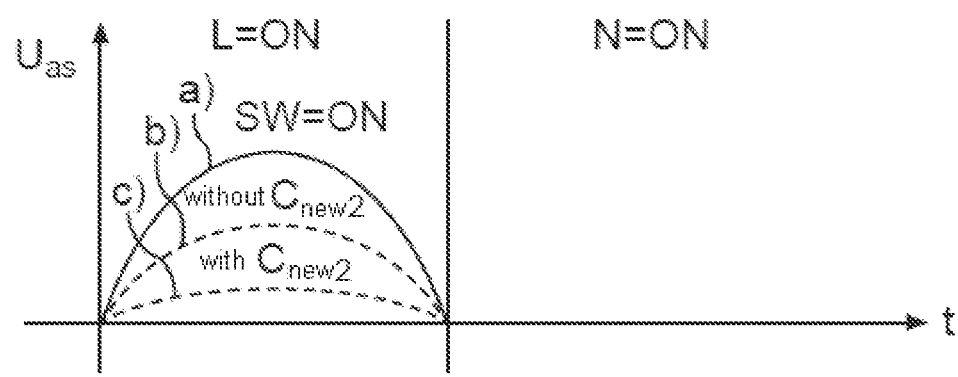
FIG. 8 shows the time profile of the signal $U_{as}$ for the time periods L=ON and N=ON, wherein, within L=ON, the different profiles are illustrated for SW=ON (curve a), SW=OFF without capacitive voltage divider (curve b), and SW=OFF with capacitive voltage divider (curve c).

Finally, FIG. 8 shows a schematic illustration of the voltage $U_{as}$ at the drive input of the microprocessor µC for the case SW=ON (curve a), SW=OFF and without the capacitance $C_{new2}$ (curve b), and SW=OFF with the capacitance $C_{new2}$ (curve c). It can clearly be seen that the contribution of the line capacitance could be reduced significantly when using a capacitive voltage divider.

By virtue of the measures of various embodiments, the length of the control line can be increased substantially fivefold. Applications which until now have only functioned with control lines of up to 5 m can now be realized successfully with control lines of up to 25 m.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An electronic control gear for operating at least one of at least one light emitting diode and at least one discharge lamp, electronic control gear comprising:
    a first terminal for coupling to a phase of an AC voltage supply;
    a second terminal for coupling to the neutral conductor of the AC voltage supply;
    a control input for coupling in a control signal of a control apparatus, which for its part is coupled to a phase of the AC voltage supply;
    a first output for coupling to the at least one light emitting diode;
    a second output for coupling to the at least one discharge lamp;
    a first driver circuit for the at least one light emitting diode;
    a second driver circuit for the at least one discharge lamp;
    an evaluation apparatus for evaluating the control signal at the control input, the evaluation apparatus comprising a microcontroller, which is coupled to the first and the second driver circuit in order to activate said driver circuits depending on the control signal, the microcontroller having a drive input which can be coupled to the control input;
    wherein a first capacitance is coupled between the second terminal and the control input.

2. The electronic control gear as claimed in claim 1, wherein the evaluation apparatus furthermore comprises a suppression apparatus, which is coupled between the control input and the drive input of the microcontroller, the suppression apparatus being designed to couple the control signal to the drive input of the microcontroller only during the time periods during which the signal at the second terminal is zero.

3. The electronic control gear as claimed in claim 2, wherein the suppression apparatus comprises an electronic switch with a control electrode, a reference electrode and a working electrode, the control electrode being coupled to the second terminal, the reference electrode being coupled to a reference potential, the working electrode being coupled to a coupling point, which is coupled on one side to the drive input of the microcontroller and on the other side to the control input.

4. The electronic control gear as claimed in claim 1, wherein a second capacitance is coupled between the coupling point and the reference potential.

5. The electronic control gear as claimed in claim 3, wherein a first ohmic resistor is coupled between the control input and the coupling point, and a second ohmic resistor is coupled between the drive input of the microcontroller and the reference potential.

6. The electronic control gear as claimed in claim 5, wherein a diode is coupled between the coupling point and the drive input of the microcontroller.

7. The electronic control gear as claimed in claim 1, wherein the microcontroller is designed to evaluate the peak value of the signal at its drive input.

8. The electronic control gear as claimed in claim 7, wherein a predeterminable threshold value is stored in the microcontroller, the microcontroller being designed to categorize a signal at its drive input as "high" when the peak value of the drive signal is above the predeterminable threshold value and as "low" when the peak value of the drive signal is below the predeterminable threshold value.

9. The electronic control gear as claimed in claim 8, wherein the predeterminable threshold value stored in the microcontroller, in relation to the peak value of the signal at the control input, is between 15 and 25% of this peak value.

10. The electronic control gear as claimed in claim 9, wherein the predeterminable threshold value stored in the microcontroller, in relation to the peak value of the signal at the control input, is between 18 and 23% of this peak value.

11. The electronic control gear as claimed in claim 1, wherein the electronic control gear furthermore comprises a rectifier, whose input has a first input terminal and a second input terminal, the first input terminal being coupled to the second terminal, the second input terminal being coupled to the first phase or the second phase or the third phase of a three-phase AC voltage supply, the low potential at the output of the rectifier representing the reference potential of the electronic control gear.

12. The electronic control gear as claimed in claim 1, wherein the input impedance of the control input is between 700 kohms and 2 Mohms.

13. The electronic control gear as claimed in claim 12, wherein the input impedance of the control input is 1 Mohm.

14. The electronic control gear as claimed in claim 1, wherein the control apparatus represents a motion sensor.

* * * * *